United States Patent [19]

Büdenbender

[11] Patent Number: 5,186,592
[45] Date of Patent: Feb. 16, 1993

[54] SHEET METAL CONTAINER WITH ATTACHED END CLOSURES

[76] Inventor: Bernd Büdenbender, Schubertweg 5, 2160-Stade, Fed. Rep. of Germany

[21] Appl. No.: 855,761

[22] Filed: Mar. 20, 1992

[30] Foreign Application Priority Data

Mar. 22, 1991 [DE] Fed. Rep. of Germany ....... 4109371

[51] Int. Cl.$^5$ ............................................. B21D 51/26
[52] U.S. Cl. .................................... 413/2; 219/121.64
[58] Field of Search ........................................ 413/2–7, 413/72–76; 219/64, 121.64

[56] References Cited

U.S. PATENT DOCUMENTS 1,709,196  4/1929  Snyder ..................................... 413/4
2,199,527  5/1940  Sebell ...................................... 413/6
4,905,858  5/1990  Büdenbender .

FOREIGN PATENT DOCUMENTS 0194885  8/1988  Japan ............................. 219/121.64
1-299787 12/1989  Japan ............................. 219/121.64

Primary Examiner—Bruce M. Kisliuk
Assistant Examiner—Jack Lavinder
Attorney, Agent, or Firm—Herbert Dubno

[57] ABSTRACT

A drum is formed by bracing a transition of a cover or between closure member inserted into the sheet metal drum body against a flank of a corrugation. A laser weld seam is formed between the flank of the corrugation and this transition region.

7 Claims, 1 Drawing Sheet

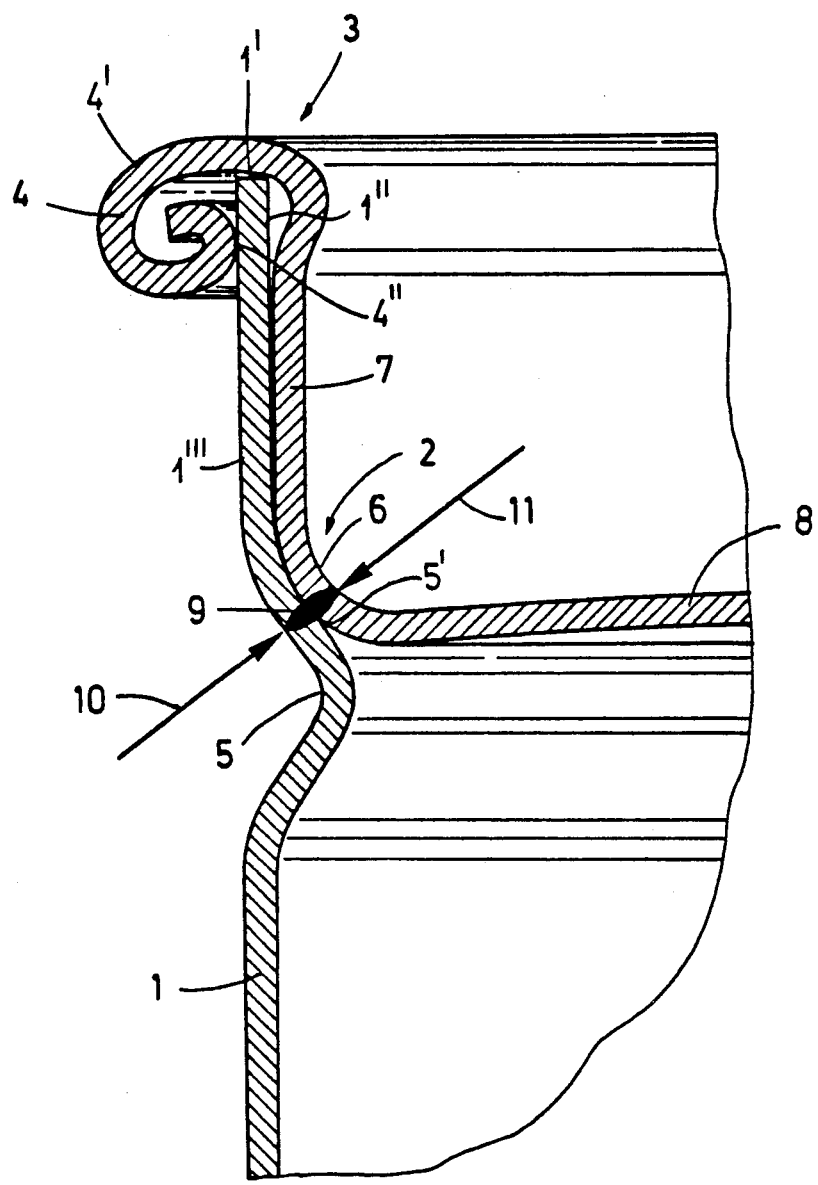

SHEET METAL CONTAINER WITH ATTACHED END CLOSURES

FIELD OF THE INVENTION

My present invention relates to a sheet metal container, especially a drum or barrel which may be referred to as a cover barrel or a bung-type barrel, whose ends are formed with respective sheet metal closures which can constitute the bottom or cover of the barrel. More particularly, the invention relates to a drum of the type in which at least one of the end closures is provided with a cup-shaped depression which is received in an open end of a generally cylindrical drum body and is welded in place.

BACKGROUND OF THE INVENTION

It is known to provide a sheet metal container, e.g. a drum, with one or both of its end closures formed as cup-shaped members whose outer dimensions correspond to the inner dimensions of open ends of a generally cylindrical sheet metal body into which the end closures is inserted.

The outer edge of the end closure can rest upon the end face of the generally cylindrical body and can have an inwardly rolled portion placed against the outer surface of the body. As described in German Patent Document DE-GM 8711650 (see U.S. Pat. No. 4,905,858), relatively cylindrical parts of an end closure and the body are secured together by a transverse weld between them.

This system has an advantage over more complicated techniques for securing an end closure to the sheet metal body and which required corresponding margins of the body and the end closure to be rolled together and systems in which a sealing mass between the end closure and the generally cylindrical body, and which had to be compatible with the contents of the drum, were required.

These earlier systems had the drawback that reuse of the barrel required cleaning which was often inhibited by the presence of joints formed by rolling two parts together. The sealing mass often also interfered with the ability to remove the end closure and thereby recondition the drum.

With the system of the aforementioned German Patent Document and U.S. Patent, these drawbacks could be avoided in that the sealing mass could be eliminated entirely and it was not necessary to fold together margins of the end closure and the sheet metal body.

However, even this system has been found to have certain drawbacks. For example, it was found to be necessary, especially where the end closure and the cylindrical body had to be welded together, to fabricate the assembly with very narrow manufacture tolerances so that place between the end closure and the body was excluded and the end closure could be fitted tightly within the body. Such narrow manufacturing tolerances, of course, required special fabrication techniques which were expensive.

A snug fit with narrow manufacturing tolerances often required that the end closure be pressed into the body with forces which tended to give rise to deformation of the parts which were assembled. This could result in defects in the fabrication of the drum.

Still another disadvantage of the earlier system was the fact that the location of the weld seam at the location intermediate the height of the end closure, between the floor of the cup-shaped structure and the outwardly bent flange thereof which had its extremity rolled inwardly against the body, i.e. in intermediate locations along the cylindrical wall of the cup shaped structure, could result in a gap, crevice or the like between the body and the end closure in which a portion of contents of the drum could remain to interfere with reuse, cleaning and reconditioning, or which could constitute a location at which corrosion could occur.

OBJECTS OF THE INVENTION

It is, therefore, the principal object of the present invention to provide an improved drum or end closure assembly for a drum composed of sheet metal which retains the advantages of the system described at U.S. Pat. 4,905,858 but which removes drawbacks thereof.

Another object of this invention is to provide a drum or barrel which can be fabricated simply and yet which will have a high resistance to pressure, without the need for sealing masses, which will be free from disadvantageous deformations of the lower edge, for example, and in which the diameter of the drum will not exceed significantly the diameter of the body in the end regions thereof, the formation of crevices and the like which might contribute to the trapping of contents of the drum upon emptying thereof will be minimized.

It is also an object of the invention to provide an improved drum in which the construction of the end closure assemblies and the portions of the drum body receiving same are more fully determinative of the interior volume of the drum so that the interior volume is less dependent on fabrication procedures and manufacturing tolerances.

It is still another object of this invention to provide an improved drum of the type described, i.e. wherein a cup-shaped end closure is fitted into and welded to the sheet metal body of the drum and has its outer edge rolled inwardly against the outer surface of the drum, whereby the end closure assembly can be fabricated with greater precision than has hitherto been the case.

SUMMARY OF THE INVENTION

These objects are attained, in accordance with the invention by providing the body of the drum with an inwardly extending circumferentially corrugation at a location spaced from the respective end edge of the body and against which the inner end of the cup-shaped depression of the end closure is braced so that the weld seam can be formed between the upper flank of this corrugation and a corresponding end of the depression which is usually the transition portion between the floor of the depression and the wall thereof although it can be the floor of the depression itself. Generally speaking, this flank and the transition will lie at an angle to the cylindrical body and hence to the axis of the drum so that the weld seam will be formed along a conical contour.

The end closures may be one or both of the covered and bottom of the drum and, according to the invention, the corrugation can be formed in the drum body prior to the insertion of the end closure axially therein until the end closure comes to rest on the upper flank or the corrugation can be formed in the body of the drum so that the upper flank will press against the transition portion of the end closure. In both cases the seam forms a lap joint.

The weld seam can be a laser weld seam and the laser beam can be directed internally against the transition region of the end closure or from the exterior against the outer surface of the flank of the corrugation.

It will be apparent, therefore, that the formation of a corrugation in the body of the drum against which the transition region of the end closure bears or is in direct contact with, allows the weld seam to be readily formed. The connection is highly pressure resistant and has been found to be mechanically stable as well upon conventional drop testing. The inwardly rolled outer margin of the end closure provides edge protection as well without significant increase in the diameter of the drum over that of the cylindrical body.

Upon impact or shock, the rolled portion of the margin and the outwardly extending flange can sustain substantial deformation before stress is applied at the weld seam and the interaction of the transition region and the upper flange of the corrugation, seated against one another, resists sheer at the weld seam.

I have found, surprisingly, that the circumferential corrugation takes up shock or impact forces in an accordion like manner with minimum residual deformation and thus provides a highly elastic shock damping structure. The residual deformations, if they occur, tend to deepen the corrugation and thus may increase its effectiveness as a stiffening rib.

Since the abutting relationship between the transition region of the end closure and the aforementioned flange of the corrugation reduces any crevice or residual space between the end closure and the drum body, emptying of the drum is more complete and any crevice between the body and the end closure is smaller and less prone to corrosion or trapping residues.

The requirements in material to form the end closure are small since the wide edges rolled together of the end closure and the drum body to form a multiple fold joint are not required.

Only the single inwardly rolled margin of the covered or bottom end closure is required to extend around the sharp free edge of the body in the respective end region thereof.

BRIEF DESCRIPTION OF THE DRAWING

The above and other objects, features and advantages of my invention will become more readily apparent from the following description, reference being made to the accompanying highly diagrammatic drawing in which the sole FIGURE is a cross sectional view through an end closure assembly which can be either the cover or the bottom of a drum according to the invention.

SPECIFIC DESCRIPTION

In the drawing, I have shown a drum comprising a cylindrical drum body 1 of sheet metal, e.g. sheet metal, whose free upper edge is represented at 1'.

Into an end portion 1", and end closure 3 can be forced to serve as the cover or bottom of this drum. The end closure 3 can have an inwardly rolled edge bead 4 formed on an inwardly extending margin or flange 4' which overlies the edge 1' and forms a protective enclosure therefore.

The end portion 1" can have an outer surface 1'" against which an inwardly turned portion 4" of the bead 4 rests.

The end closure 3 is a cup shaped member with a cylindrical wall 7, a transverse floor 8 and a rounded transition region 2 formed in a depression or embossment 2. The end closure 3 can be produced by deep drawing or stamping from sheet metal.

The body 1 of the drum is formed with an inwardly extending corrugation 5 pressed into the drum, e.g. by a rolling process once the cover 3 has been inserted or provided before insertion of the cover 3 so that the transition region 6 will rest directly against the upper flank 5' of the corrugation 5 and the corrugation is based against the transition region 6 and vice versa.

In this region in which the transition portion 6 and the corrugation flank 5' are braced against one another, a weld seam 9 is formed, e.g. by laser welding, although other welding may be used, for example, electrical seam welding, protective gas arc welding or the like.

As represented by the arrow 10, a welding laser beam can be directed practically perpendicular to the upper flank 5' of the corrugation 5 or as shown by arrow 11, at an inclination to the wall 7 from within the end closure 3, also perpendicular to the flank 5'.

Preferably, however, both laser beams are used. The laser beams 10 and 11 can be aligned with one another or directed onto the same angular zone of the drum or can be offset from one another circumferentially and the drum can be rotated past the location at which the laser beams are set upon the drum laser or are swept around the axis of the drum.

In fabrication of the assembly, a disk-shaped flange can be pressed into the end of the drum to form the depression 4 and the margin of the blank remaining outside the drum can then be rolled around its free edge. The body 1 of the drum, which has previously been rolled to cylindrical shape and welded together, can then have the corrugation 5 rolled therein. Alternatively, the corrugation 5 can be rolled into the sheet metal before the later is given its cylindrical shape and welded axially along the outer seam.

The drum can also be fabricated by pressing a preformed closure member into the end of the drum until the transition region 6 comes to rest against the upper flange of the corrugation 5.

Upon rotating the closure member and body clamped together with the transition portion 6 against the flange 5', the weld seam can be applied, especially if rotation of the laser generator about the axis of the drum is not desired.

According to an aspect of the invention, it is possible to apply the closure member to the drum so that the flange 4' will rest against the edge 1' and with the bottom 8 and the transition region 6 pressed axially, the corrugation 5 can be rolled into the drum and pressed firmly against the transition region 6. This system has the advantage that any residual deformation takes place in the region in which the corrugation forming tools apply forces to the assembly. Welding can be effected in the manner described. The invention provides a relatively simple assembly of the covered or bottom in an end of the body of the drum, without excessive concern for manufacturing tolerances. Since the weld seam 9 is practically at the bottom of the closure member and the flange 4' is pressed against the edge 1', substantial deformation of the edge region can be sustained before significant shear forces are generated in the region of the weld seam 9.

Forces applied in the region of the weld seam are resiliently taken up axially by the corrugation which yields in the axial direction while providing an overall stiffening effect in the overall drum.

Emptying and cleaning are simplified as well since large crevices in which residues of the container contents can be trapped ar largely avoided. The elimination of the need for multiple folds also constitutes a saving of material.

I claim:

1. A method of making a drum which comprises the steps of:
   a) forming a drum body having an end provided with an end edge and axially inwardly of said edge, an inwardly extending circumferential corrugation having a flank turned toward said end;
   b) inserting in said end a sheet metal closure member formed with a depression having a cylindrical wall lying along said body, a transition region extending inwardly, and a floor extending transversely so that said transition region lies circumferentially against said flank, said wall having a margin extending outwardly across said edge and formed with a bead rolled inwardly against said body; and
   c) laser welding a circumferential weld seam between said flank and said transition region all around said closure member so as to circumferentially weld the closure member to the drum body.

2. The method defined in claim 1 wherein said corrugation is formed in said body subsequent to insertion of said closure member therein while said depression is braced to press said flank against said transition region.

3. The method defined in claim 1 wherein said bead is rolled around said edge subsequent to insertion of said depression in said body.

4. The method defined in claim 1 wherein said corrugation is formed in sheet metal of said body prior to shaping sheet metal of said body into cylindrical form.

5. The method defined in claim 1 wherein said seam is formed by directing a laser beam into said corrugation.

6. The method defined in claim 5 wherein said laser beam is directed against said flank perpendicular thereto.

7. The method defined in claim 1 wherein said seam is formed by directing a laser beam into said closure member against said transition region.

* * * * *